United States Patent [19]
Mittelhäuser et al.

[11] Patent Number: 5,851,000
[45] Date of Patent: Dec. 22, 1998

[54] EXTERNAL REAR VIEW MIRROR FOR MOTOR VEHICLES

[75] Inventors: Bernhard Mittelhäuser, Am Krähenberg 3, D-30900 Wedemark; Dietmar Leder, Barsinghausen; Jan Schubert, Wedemark, all of Germany

[73] Assignee: Bernhard Mittelhäuser, Wedemark, Germany

[21] Appl. No.: 689,994

[22] Filed: Aug. 16, 1996

[30] Foreign Application Priority Data

Aug. 16, 1995 [DE] Germany .................. 195 30 043.2

[51] Int. Cl.$^6$ .................................................. A47G 1/24
[52] U.S. Cl. ............................................................ 248/479
[58] Field of Search .................................. 248/466, 485, 248/484, 479, 900, 486, 487, 476, 477

[56] References Cited

U.S. PATENT DOCUMENTS

| | | |
|---|---|---|
| 2,533,475 | 12/1950 | Koonter ................................. 248/478 |
| 4,078,758 | 3/1978 | Mittelhauser et al. .................. 248/484 |
| 4,281,815 | 8/1981 | O'Connell et al. ..................... 248/479 |
| 5,059,014 | 10/1991 | Mittelhauser et al. .................. 359/841 |
| 5,099,362 | 3/1992 | Mittelhauser et al. .................. 359/841 |
| 5,327,294 | 7/1994 | Koske et al. ............................ 359/872 |

*Primary Examiner*—Leslie A. Braun
*Assistant Examiner*—Gwendolyn Baxter
*Attorney, Agent, or Firm*—Robert W. Becker & Associates

[57] ABSTRACT

An external rear view mirror for motor vehicles is provided, and includes a housing that conforms to a streamlined shape of the vehicle. The housing serves to accommodate an adjustable mirror body. The forward end of the housing, as viewed in a forward direction of travel of the vehicle, merges with a part of the vehicle. To avoid breaks and steps in the vicinity of this end, the forward end of the mirror housing is adjustable, especially with respect to its height, when the mirror has already been mounted on the vehicle.

9 Claims, 2 Drawing Sheets ns of 5,851,000

EXTERNAL REAR VIEW MIRROR FOR MOTOR VEHICLES

BACKGROUND OF THE INVENTION

The present invention relates to an external rear view mirror for a motor vehicle and has a housing that conforms to a streamlined shape of the vehicle. The housing accommodates an adjustably mounted mirror body and has a forward end, as viewed in a forward direction of travel of the vehicle, that merges with a part of the vehicle.

During assembly and mounting of such mirrors, problems can arise if for tolerance reasons or reasons of operation the mirror housing on the one hand and the adjoining vehicle part on the other hand cannot be precisely matched to one another with respect to their relative positions. For this reason, it is often necessary to make allowances for breaks or steps, although this stands in the way of the requirement for an as streamlined configuration as possible.

It is therefore an object of the present invention to provide a mirror of the aforementioned general type that permits an extensive adjustment of the mirror housing and an adaptation of the mirror housing to conditions of the vehicle.

BRIEF DESCRIPTION OF THE DRAWINGS

This object, and other objects and advantages of the present invention, will appear more clearly from the following specification in conjunction with the accompanying schematic drawing, in which.

SUMMARY OF THE INVENTION

Figure 1:
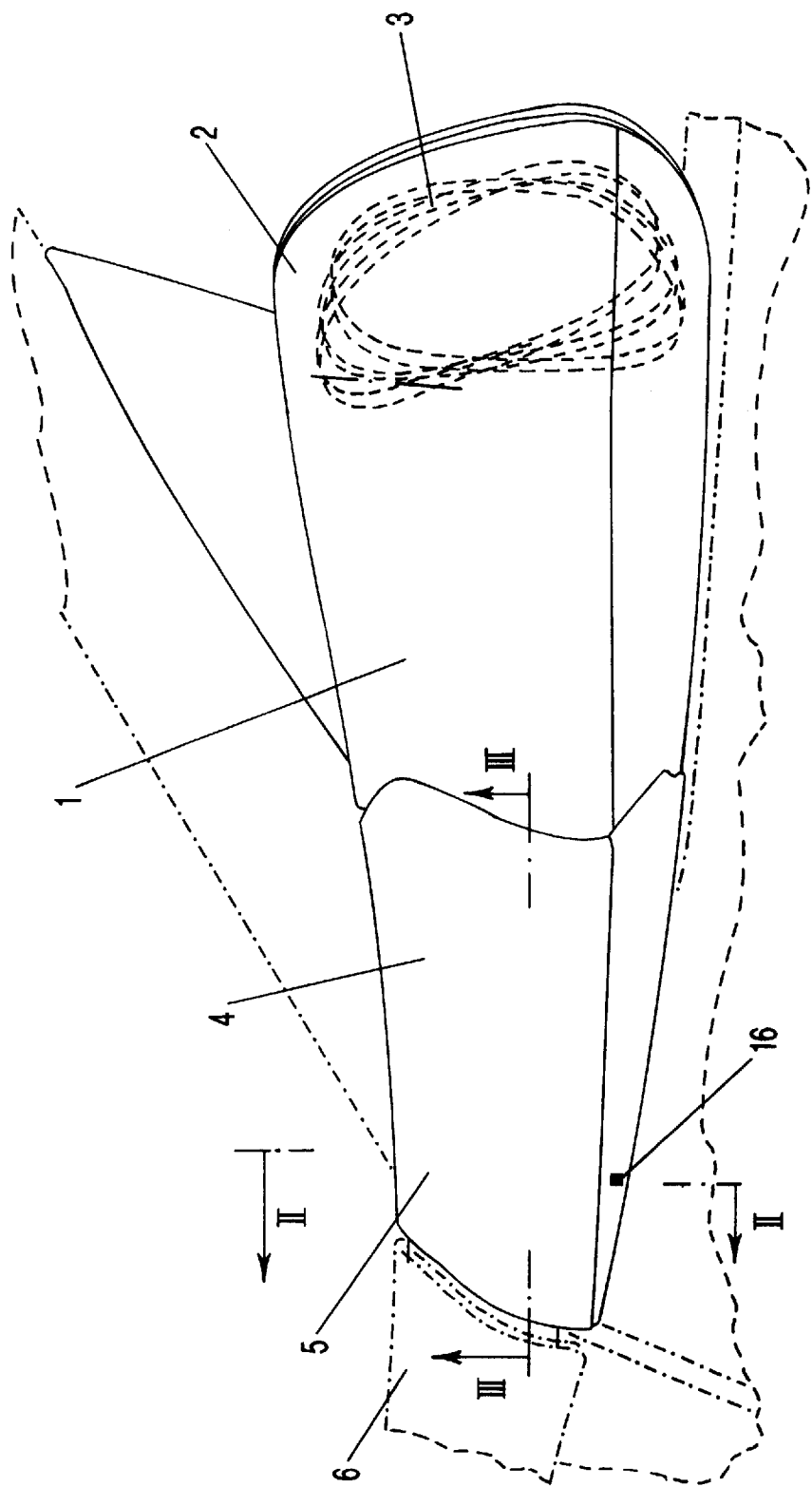
FIG. 1 shows one exemplary embodiment of an external rear view mirror for a vehicle and also indicates, in dashed lines, adjoining vehicle parts.

The external rear view mirror of the present invention is characterized primarily in that that end of the mirror housing that faces the vehicle part is adjustable when the base of the housing is mounted on the vehicle. Pursuant to one specific embodiment of the present invention, to effect this the mirror housing is embodied in such a way that it is possible to adjust the height thereof. Accordingly, an adjustment of the mirror housing can be carried out after the mirror has already been mounted, i.e. the mirror has been secured to the vehicle, or the mirror is already in use. The great advantage of being able to adjust the height of the mirror housing is that breaks or steps can be compensated for.

In order to be able to carry out such an adjustment, the fastening elements for the mirror housing can be made adjustable in a suitable manner, or it may be expedient to separate the mirror housing into two or more parts. To realize the inventive concept, however, it is preferably merely necessary to make the outer shell of the mirror housing adjustable relative to the fixed part of the mirror housing. This part of the housing can then be securely mounted, and only then is an adjustment or readjustment undertaken.

To the extent that the mirror housing is split, or the portion of the mirror housing that accommodates the mirror body is pivotable or tiltable relative to the base of the housing, it is sufficient if the measures that serve for the adjustment merely be carried out at the forward end of the base of the housing. In addition, the structural elements that serve for the adjustment are preferably slightly pivotably mounted so that that end that is remote from the pivot axis can be adjusted, and in particular the height of the housing part can be adjusted. In this connection, it is particularly advantageous to provide a cam or eccentric adjustment means, and in particular in such a way that after assembly has been completed a tool can be introduced from the outside via a small opening in order in this way to effect a movement of the cam or eccentric shaft.

Further specific features of the present invention will be described in detail subsequently.

DESCRIPTION OF PREFERRED EMBODIMENTS

Referring now to the drawing in detail, a base 1 of a mirror housing is securely connected to a vehicle by a number of fastening means, with this housing base 1 serving for the mounting or carrying of a hollow rear housing portion 2 (as viewed in the forward direction of travel of the vehicle). This rear portion 2 accommodates an adjustable mirror body 3, a number of positions of which are indicated by dashed lines. The portion 2 can move relative to the mirror base 1, so that it can be pivoted into a parking position and/or can deflect when it is impacted. The mirror base 1 continues in a forward direction, in other words, in the direction of forward travel of the vehicle, with this continuation being in the form of the forward section 4. The outer surface or shell 5 of the forward portion 4 merges toward the rear without a break or step into the portion 2, and toward the front merges with the hood 6 of the vehicle. Although these transitions are not entirely gap-free, there should none the less be no breaks or steps 7, and it is therefore the objective of the present invention to compensate for or eliminate such steps 7 after the mirror base 1 has already been mounted and due to manufacturing tolerances or during operation of the vehicle such steps 7 result.

That end of the outer shell 5 that faces the portion 2 is provided with a thin, downwardly projecting flange 8 that has a hole-like aperture 9. The flange 8 engages a gap or slot 10 of the leg 11 of the mirror base 1; the slot 10 has a thickness that corresponds essentially to the thickness of the flange 8. In addition, the leg 11 is provided with a projection 12 that engages the aperture 9 so that the flange 8, and hence the outer shell 5, is protected from being pulled out or the like. However, it should be noted that this positive connection is such that slight pivoting movements of the outer shell 5 in the direction of the double arrow 13 are permitted.

Such a pivoting movement can be carried out by the application of external force after the mirror has been mounted on the vehicle. To accomplish this, the mirror base 1 is provided with two support or mounting means 14 for a shaft 15 that can be turned from the outside via a blind hole 16 and by means of a key, wrench, or the like. The central portion of the shaft 15 is eccentrically disposed and is surrounded in a manner free of play by a prong means 17 that on the inside is secured to the outer shell 5. Thus, by turning the shaft 15 the outer shell 5 can be raised and lowered to thereby eliminate the step or gap 7.

It is to be understood that the displacement with the aid of the shaft 15 and the prong means 17, which is disposed free of play, is continuous, i.e. successive raising and lowering movements can be achieved by rotating the shaft.

The aforementioned articulation of the outer shell 5 has the advantage that for purposes of mounting, the prong means 17 of the outer shell 5 are first pressed onto the shaft 15, and then the flange 8 of the outer shell can be introduced into the slot 10. This introduction of the flange 8 into the slot 10 results in a snap connection, since the flange 8 can slightly deform, whereby the projection 12 snaps in. The slight deformability of the flange 8 also permits pivoting of the outer shell 5 in the direction of the double arrow 13.

Figure 2:
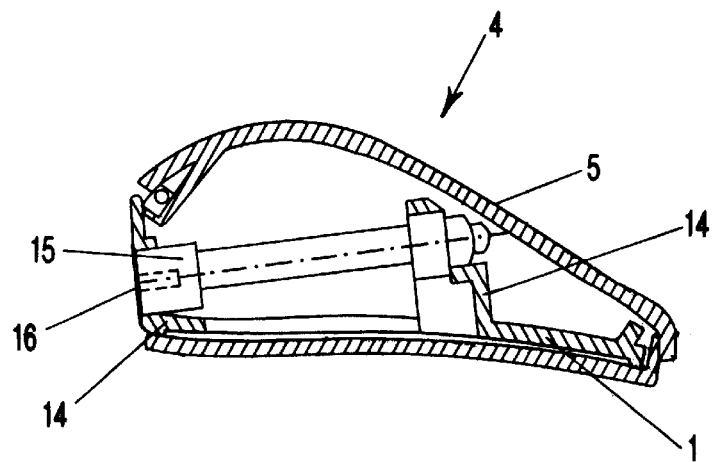
FIG. 2 is a partial cross-sectional view taken along the line II—II in FIG. 1.
Figure 3:
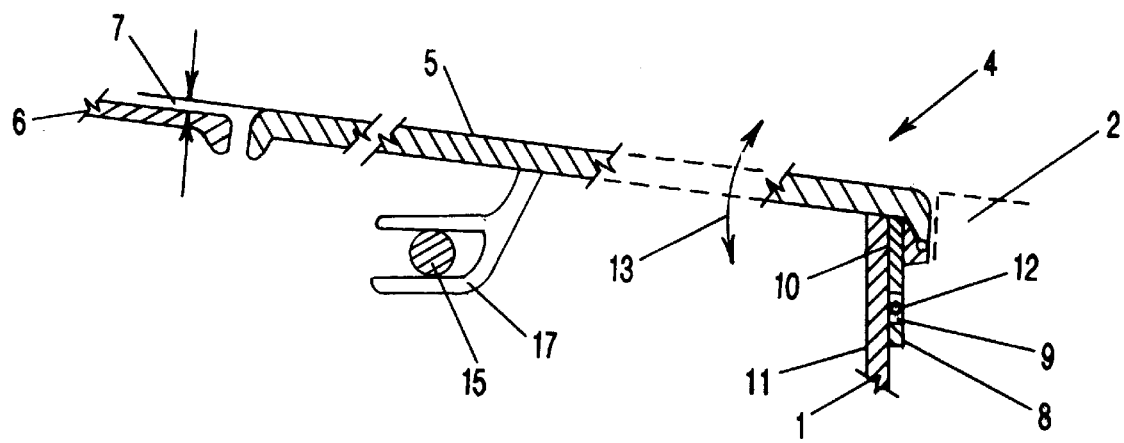
FIG. 3 is a partial cross-sectional view taken along line III—III in FIG. 1.

It should be noted that in order to facilitate illustration, the prong means 17 was not shown in FIG. 2. Similarly, FIG. 3 shows the shaft 15 of the housing base 1 only in cross-section.

It is furthermore advantageous to provide a positive connection between the prong means 17 and the shaft 15 in such a way that axial displacement of the shaft 15 relative to the prong means 17, or of the prong means 17 relative to the shaft 15, cannot occur. For example, the prong means 17 can be provided with a small projection that engages in a circumferential groove of the shaft 15.

The present invention is, of course, in no way restricted to the specific disclosure of the specification and drawing, but also encompasses any modifications within the scope of the appended claims.

What we claim is:

1. An external rear view mirror for a motor vehicle, including a housing that conforms to a streamlined shape of said vehicle and that is adapted to accommodate an adjustable mirror body, whereby said housing has a forward end, as viewed in a forward direction of travel of said vehicle, that merges with a part of said vehicle, said housing further comprising:

a base that is mounted to said vehicle; and a forward section at said forward end of said housing, wherein said forward section is adjustable relative to said base and to said vehicle when said base is mounted on said vehicle, wherein said forward section is provided with an outer shell, and merely said outer shell is adjustable, wherein when viewed in said forward direction of travel of said vehicle, said base of said housing is provided with a forward portion on which said outer shell is adjustably disposed, and is also provided with a rear portion for adjustably carrying a portion of said mirror that accommodates said mirror body, and wherein said adjustability of said forward section is effected by pivoting about a transverse axis, said forward section being pivotable about an eccentric shaft that is externally rotatable and that is engaged in a manner that is practically free of play by legs of a prong.

2. A mirror according to claim 1, wherein said forward section is adjustable in height.

3. A mirror according to claim 1, wherein said forward section is pivotably mounted on said eccentric shaft.

4. A mirror according to claim 3, wherein one end of said eccentric shaft is provided with a blind hole for receiving a tool from externally for effecting rotation of said eccentric shaft.

5. A mirror according to claim 3, wherein said prong and said eccentric shaft are positively connected in such a way that axial displacement of said eccentric shaft relative to said prong, or displacement of said prong relative to said eccentric shaft, is prevented.

6. A mirror according to claim 5, wherein said prong is provided with a projection that engages a circumferential groove of said eccentric shaft.

7. A mirror according to claim 1, wherein said vehicle part is a hood of said vehicle, and wherein said forward section of said housing is adjustable to a rear edge of said hood as viewed in the forward direction of travel of said vehicle.

8. An external rear view mirror for a motor vehicle, including a housing that conforms to a streamlined shape of said vehicle and that is adapted to accommodate an adjustable mirror body, whereby said housing has a forward end, as viewed in a forward direction of travel of said vehicle, that merges with a part of said vehicle, said housing further comprising:

a base that is mounted to said vehicle; and a forward section at said forward end of said housing, wherein said forward section is adjustable when said base is mounted on said vehicle, wherein said adjustability of said forward section is effected by pivoting about a transverse axis, and wherein a pivoting part of said forward section, in the vicinity of a pivot axis thereof, is supported by a projecting flange of said pivoting part, whereby said flange is introduced into a slot of said base of said housing to effect a snap-type connection with said base.

9. A mirror according to claim 8, wherein an opening of said prong means is disposed in a forward direction when viewed in said forward direction of travel of said vehicle.

\* \* \* \* \*